Figure 1:
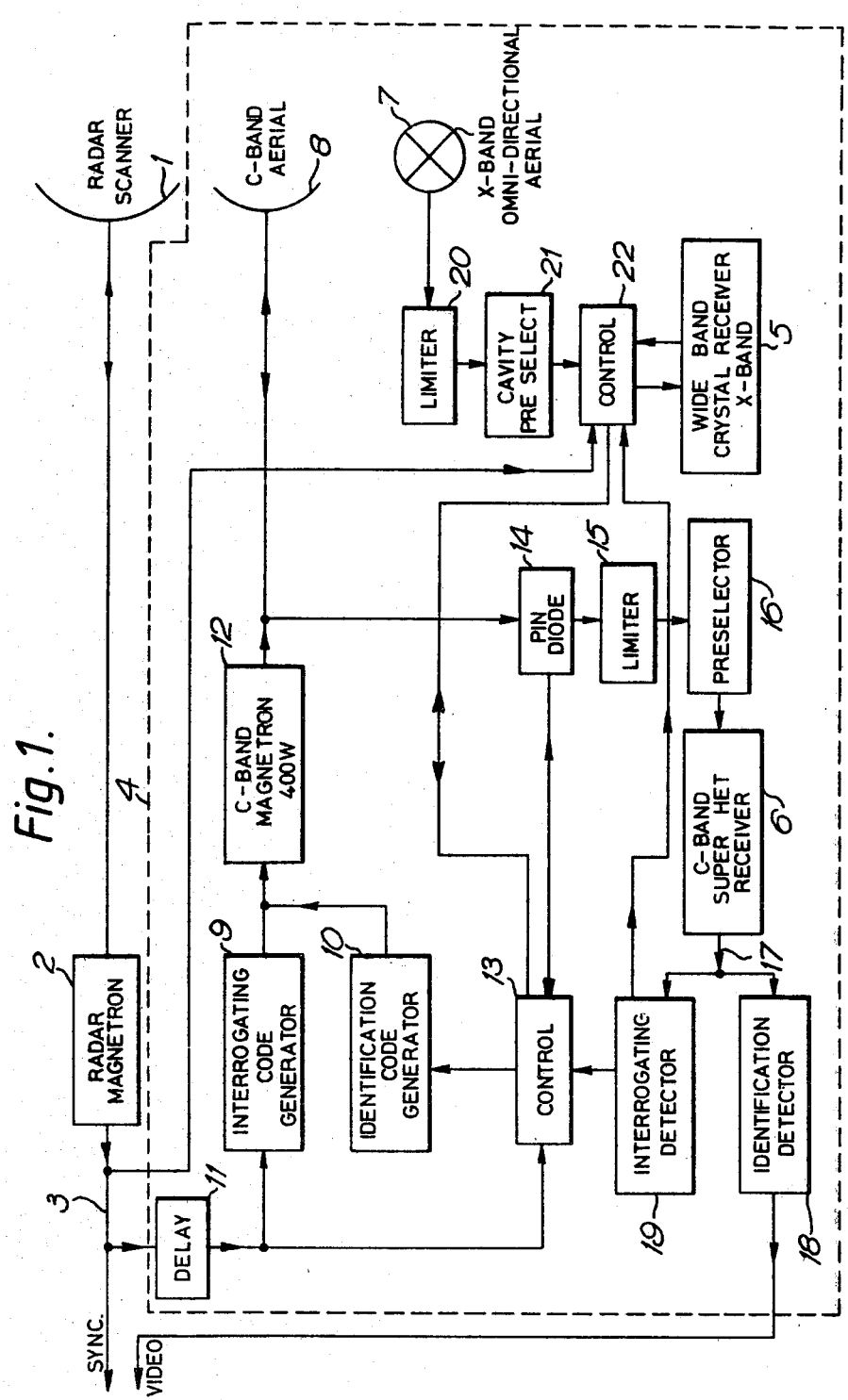

United States Patent [19]

Moore et al.

[11] 4,364,049
[45] Dec. 14, 1982

[54] RADAR TRANSPONDERS

[75] Inventors: Alan R. Moore; John Waterworth, both of Fareham, England

[73] Assignee: The Secretary of State for Defence in Her Britannic Majesty's Government of the United Kingdom of Great Britain and Northern Ireland, London, England

[21] Appl. No.: 151,531

[22] Filed: May 19, 1980

[30] Foreign Application Priority Data

May 23, 1979 [GB] United Kingdom ................. 7917859

[51] Int. Cl.³ .............................................. G01S 13/87
[52] U.S. Cl. .................................. 343/6 R; 343/6.5 R
[58] Field of Search ............................ 343/6 R, 6.5 R

[56] References Cited

U.S. PATENT DOCUMENTS

| 3,049,705 | 8/1962 | Owen et al. | 343/6 R |
| 3,122,737 | 2/1964 | Setrin | 343/6.5 R |
| 3,956,747 | 5/1976 | Leypold et al. | 343/6 R |
| 4,034,371 | 7/1977 | Maier | 343/6 R |

FOREIGN PATENT DOCUMENTS

| 991362 | 7/1961 | United Kingdom . |
| 1278451 | 6/1969 | United Kingdom . |
| 1373358 | 10/1971 | United Kingdom . |
| 1379693 | 3/1972 | United Kingdom . |
| 1395872 | 12/1973 | United Kingdom . |

*Primary Examiner*—T. H. Tubbesing
*Attorney, Agent, or Firm*—Stevens, Davis, Miller & Mosher

[57] ABSTRACT

An interrogator/transponder for identification of co-operating pulse radar-fitted marine vessels comprises a detector responsive to signals in the radar frequency band and a C-band transmitter/receiver connected such that on receiving a C-band interrogating signal together with a radar signal an identity signal produced by a signal generator is transmitted. When used for interrogation an interrogating signal is produced by a second signal generator for transmission with the radar signal and the received identity signal from the interrogated vessel is presented on a radar display adjacent to the return radar signal.

3 Claims, 2 Drawing Figures

SYSTEM TIMING DIAGRAM

RADAR TRANSPONDERS

The invention relates to the identification of co-operating maritime vessels equiped with radar.

Early recognition of one high speed vessel by another is essential to avoid close quarter situations and reduce the possibility of collisions in areas of high traffic density. A particular example of this problem arises with high speed hovercraft. For collision avoidance navigation purposes, all conventional vessels can be assumed to be stationary when viewed from the hovercraft and therefore the responsibility for collision avoidance maneuvers is then completely upon the pilot of the hovercraft. When approached by another hovercraft, however, normal avoidance procedures must be observed. Hence it is necessary to be able to recognize another hovercraft as soon as possible so that a close quarter situation does not occur. When viewing a fast moving hovercraft on the radar of a conventional craft, its presence is indicated by a long afterglow trail on the Radar Plan Position Indicator (PPI). With the high closing speed of two hovercraft on reciprocal courses, incomplete scan to scan paint overlap reduces the intensity of the PPI afterglow. The trail therefore decays more quickly than that produced by slower craft. This effect gives hovercraft and conventional craft afterglow trails of similar length.

Currently operational in-band radar beacons cannot reply immediately on the interrogating frequency, they have to sweep through the marine X-Band radar frequency spectrum with a consequent inability to respond to every interrogation. With present systems the time between replies to an interrogating radar may be between 90 and 120 seconds. In this time the range between two hovercraft approaching each other at a relative speed of 120 kts would reduce by between 3 and 4 nautical miles, which is unacceptable. In addition the replies from a transponder would be received by all vessels fitted with X-band radar. This would not only produce unnecessary interference on their displays, but more seriously, may be mistaken for radar beacon navigation marks.

The object of the invention is to overcome the problems of vessel recognition by providing a system capable of rapid identification of co-operating vessels.

The present invention provides a transponder for identification of pulse radar-fitted marine vessels comprising a detector responsive to signals in the radar frequency band and a transmitter/receiver operating in a second frequency range connected such that on receiving a radar signal and an interrogating signal at said second frequency an identity signal is transmitted at said second frequency. Preferably the transponder has a synchronizing connection from the radar transmitter to the transmitter/receiver such that when used in the interrogation mode the interrogation signal is delayed relative to the radar signal so as to occur a short time in advance of the subsequent radar signal. Advantageously the second frequency is in the c-band, ie 5.47–5.65 GHz, as this band is currently little used. The transponder identification system thus requires two frequency bands for operation which aids the security of the system. Additional security can be obtained by coding the interrogating signal. The interrogating coded signal may comprise two pulses whose separation determines the code. In a preferred arrangement the transponder includes substantially omni-directional c-band and radar band aerials. In order to minimize the effects of time delays due to detection of the coded interrogation signal and to transmitting the identity signal, the transponder preferably includes an identification code generator which is activated on receiving the interrogating signal and connected so that transmission of the identity signal occurs as soon as the subsequent radar signal is detected. Preferably the identity signal is a 4-pulse coded signal.

In order to interrogate a selected number of co-operating vessels provided with similar transponders, each transponder may have differing selectable interrogation codes. When a transponder is in the interrogated mode the c-band identity signal is transmitted by the interrogated transponder simultaneously with the radar return. The indentity signal is preferably connected to the radar display and may be arranged so that it is presented adjacent to the radar return on the display. Alternatively the identity signal may be connected via a decoding circuit to the radar display.

Figure 2:
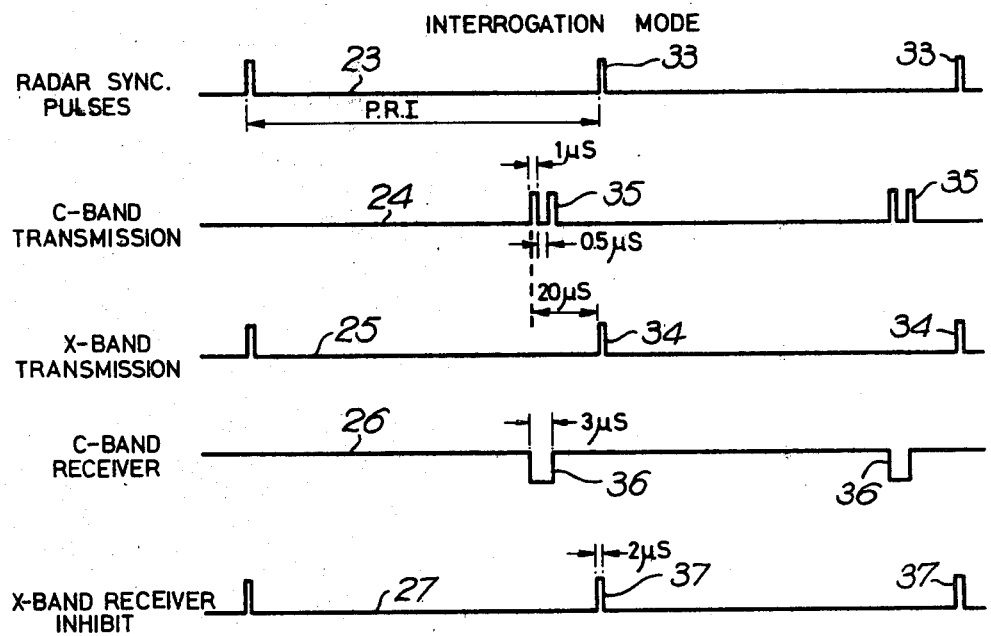
Figure 2:
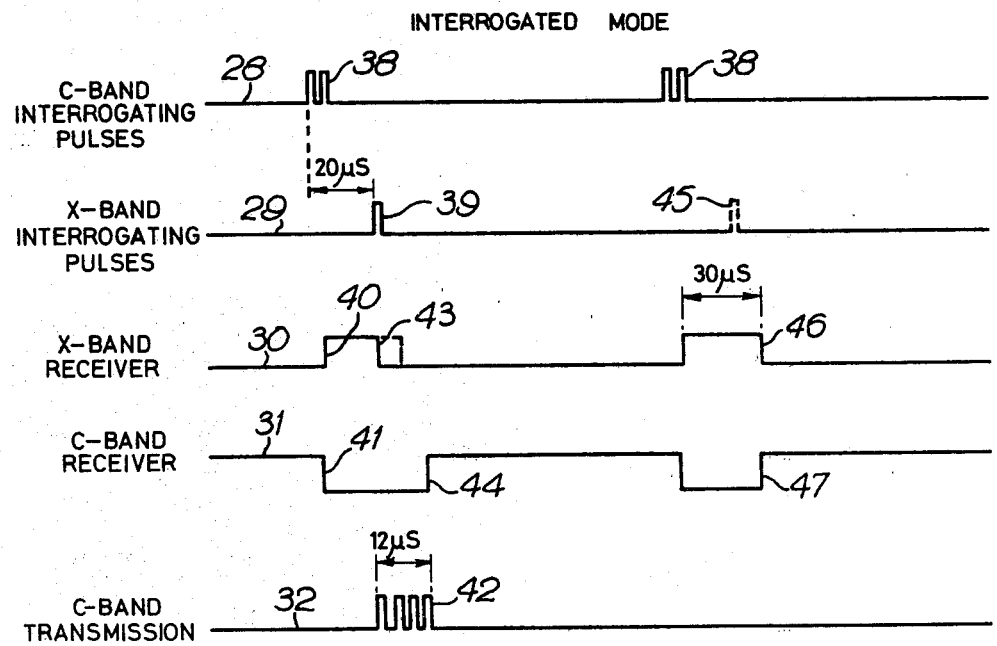

The invention will now be described by way of example only with reference to the following drawings of which:

FIG. 1 shows a block diagram of a marine identification interrogator 1 transponder, and FIG. 2 shows a system timing diagram for the interrogator 1 transponder of FIG. 1.

FIG. 1 shows a conventional X-band radar scanner 1 coupled to a magnetron 2. Typically the radar operates within the maritime radar frequency band of 9.3 to 9.5 GHz. An output 3 from the magnetron 2 provides synchronizing pulses for the PPI display. The synchronizing output 3 is also used as an input to a marine identification interrogator 1 transponder 4. The interrogator 1 transponder 4 includes a wide band crystal receiver 5 operating in the X-band and a C-band superhot receiver 6 together with respective aerials 7 and 8. The C-band frequency range is 5.47–5.65 GHz. The interrogator 1 transponder also includes a 2-pulse interrogating code generator 9 and a 4-pulse identification code generator 10.

The interrogating signal, comprising two pulses whose separation represents the interrogating code, is generated by the code generator circuit 9 whenever an output is received from a delay circuit 11 connected to the synchronizing output 3 from the X-band magnetron 2. The output from the code generator circuit 9 is connected to a C-band transmitter comprising a 400 Watt C-band magnetron 12 and the C-band aerial 8. In order to protect the C-band receiver 6 during C-band transmission the output from the delay circuit 11 is also connected to a control circuit 13 which turns off a PIN diode gate 14 which is connected between the C-band aerial 8 and the input to the C-band receiver 6. The delay circuit 11 is a digital device incorporating a series of parallel delays. The main X-band radar may work with differing transmission frequencies. The appropriate delay is chosen automatically such that the C-band transmission of the interrogating code occurs with every X-band pulse so that the C-band transmission can occur relatively slowly. The time delay is chosen such that the C-band interrogating transmission preceeds the subsequent X-band radar pulse by 20$\mu$ secs so as to aid the identifying reply as will be described below.

When in the interrogating mode on reception of an identifying C-band transmission from a transponder on another vessel the received identifying signal is connected from the C-band aerial 8 through the now open PIN diode 14 and a limiting circuit 15 to a resonant cavity preselector 16 and thence to the C-band receiver 6. The C-band receiver output 17 is connected both to an interrogating detector 19 and an identification detector 18. If the received signal is a 4-pulse identification signal transmitted by the other transponder in response to an own transponder interrogation, the signal output from the identification detector 18 is decoded and connected to the radar display where the appropriate identity can be written on the display adjacent to the X-band radar return from the other vessel.

When in the transponding mode, on receiving a 2-pulse C-band interrogating signal from another transponder the received interrogating signal is again connected from the C-band aerial 8 to the output 17 of the C-band receiver 6. When the interrogating signal, is identical to a preset code in the interrogating detector 19 an output signal, is connected via the control circuit 13 to the 4-pulse identification code generator 10 which is thereby activated ready for transmission. The control circuit 13 simultaneously opens a 30$\mu$ sec window by sensitizing the X-band receiver 5 and desensitizes the C-band receiver 6. The 30$\mu$ sec window is selected to be long enough to allow for any variation in transmission time difference between the C-band interrogating signal and the X-band main radar signal which may arise because the pulse repetition frequency of the radar is not constant. On receiving an X-band signal at aerial 7 within the 30$\mu$ sec window the received X-band signal is connected to the X-band receiver 5 via a limiter 20. A resonant cavity preselector 21 and a control circuit 22 are connected to the X-band receiver 5. The control circuit 22 is arranged to sensitize the X-band receiver 5 on receiving a control signal from the interrogating detector 19. After detection of the X-band signal by the receiver 5, the control circuit 22 transmits a control signal to the control circuit 13 which initiates the transmission of the 4-pulse identification code by the C-band magnetron 12. By sending the interrogating coded signal ahead of the X-band radar pulse signal in this way there is no delay in the system resulting from the time taken to decode the interrogating signal or to activate the C-band transmitter in readiness for transmission so that on receiving the following X-band pulse signal the identification 4-pulse code is transmitted immediately.

FIG. 2 shows the system timing diagrams for a transponder in the interrogation mode, 23-27, and in the interrogated mode, 28-32. Referring to the interrogation mode, the trace 23 shows the radar synch pulses 33 corresponding to the X-band transmitted pulses 34 shown in trace 25. The radar synch pulses 33 are delayed before connection to the C-band transmitter such that the 2-pulse interrogating signal 35 is transmitted 20$\mu$ sec before the subsequent X-band radar pulse signal 34. As shown, the interrogating signal 35 comprises two 1$\mu$ sec pulses separated by 0.5$\mu$ sec. Trace 26 shows that the C-band receiver 6 is switched on continuously except for a 3$\mu$ sec period 36 during which the C-band signal 35 is transmitted. The trace 27 shows that the X-band receiver 5 is turned off for a 2$\mu$ sec period 37 during the transmission of X-band pulses 34. Referring to the interrogated mode traces 28-32, the trace 28 shows the received C-band interrogating pulses 38 which arrive 20$\mu$ sec ahead of the X-band pulses 39 shown in trace 29. On receiving and detecting a coded C-band interrogating signal a 30$\mu$ sec window is produced during which the transponder is sensitized to X-band pulses. During this window the X-band receiver 5 is sensitized as shown by the switch-on position 40 in trace 30 and the C-band receiver 6 is desensitized as shown by the switch-off position 41 in trace 31. At the same time the 4-pulse identification code generator 10 is activated. On receiving the X-band pulse 39 within the 30$\mu$ sec sensitive window of the X-band receiver 5, the C-band magnetron 12 immediately transmits the 4-pulse identity code 42 as shown in trace 32. At the same time the X-band receiver 5 is desensitized as shown by the switch-off position 43. Immediately after the C-band transmission of the identity code 42 the C-band receiver is resensitized as shown by the switch-on position 44. If there is no X-band pulse detected during the 30$\mu$ sec window following the detection of the interrogating C-band pulses 38 as indicated by the missing pulse 45 the activated 4-pulse identification code generator 10 is not triggered and thus the 4-pulse C-band identity code 42 is not transmitted. At the end of the 30$\mu$ sec window the X-band receiver is desensitized as indicated by the switch-off position 46 and the C-band receiver is resensitized as indicated by the switch-on position 47.

In use, a transponder according to the invention provides a coded mark on the radar PPI adjacent to the normal radar return from a vessel also fitted with one of these transponders. The identifying code can be made unique to that vessel or, if required, unique to a group or class of vessels. When the identification of other vessels is required by the radar operator aboard one vessel, a control switch is provided to switch on the C-band interrogating pulse transmissions. Each transponder within range determines automatically whether the interrogating pulses require a reply. If the received code is not correct the transponder ignores the interrogation, whereas if the code is correct, the transponder awaits the main radar pulse from the interrogating vessel and on receipt of this pulse immediately replies with a coded string of pulses which is received by the interrogating transponder, decoded and displayed on the radar PPI display. By altering the interrogating code, different classes or types of vessel can be interrogated. Individual vessel or type of vessel identification is provided by altering the code in the code generator 10. Due to the dual frequency interrogation requirement together with an interrogating code, interference from other equipment or other vessels interrogating these transponders is negligible.

The transponder can be made as a complete unit containing all the required receiving and transmitting aerials and needing only a synchronizing pulse connection from the radar transmitter and inputs to the radar display video circuits. A simple switch can be provided in a convenient location for changing the interrogating code thereby enabling selection of the vessel or vessels to be interrogated.

If the transponder system is to be used only by a small group of co-operating targets such as hovercraft the vessel identification codes could be displayed directly on the radar PPI display instead of decoding before display. The transponder has the advantages that it responds automatically to interrogation, requires no modification to the main radar, and failure of the transponder would not result in loss of the main radar. Other frequency bands could be used instead of the C-band, however the C-band is convenient as its use would not cause interferance to other vessels since the band is little used. In order to increase the transponder range, the C-band is prefereably circularly polarized as as to minimize the effects of sea reflection. Preferably also the two aerials 7 and 8 are omni directional.

Selective reception of target response could be achieved by the addition of a range gate. This could simply use the radar's own range marker to produce a video gate through which only responses in a given window would be received. In a dense target environment where two responses could orginate from the same range, a bearing gate might also be used. The individual response codes could then be sequentially decoded and displayed. In addition to use for identification of high speed vessels the transponder could also serve to identify ferries approaching harbours so that docking areas can be selectably assigned or for vessel identification in general. The transponder could also serve to identify certain navigational marks such as wrecks, harbor entrances, light vessels, oil rigs, hazards, etc, in a manner similar to present in- and out-of-band radar beacons. Ships fitted with a transponder capable of triggering these navigational marks could then be able to identify and display on their radar PPI the positions of such marks. Transponders used in this manner to identify navigational marks would preferably reply with an identity signal on receiving both an interrogating signal and the radar signal together, and ignoring any interrogations where an interrogating signal is received before the radar signal. In this way vessels fitted with a dual frequency transponder would not normally interrogate navigational marks, but on switching out the delay 11 (FIG. 1), navigational marks fitted with the above modified transponder would reply automatically. This would be necessary where interrogating transponders have been fitted with range and bearing gates so as to reduce interference in a dense target environment. These gates could therefore be turned off in this mode as only transponders fitted navigational marks would respond. As vessels are normally fitted with S or X band radars, navigational mark transponders could be designed to respond to either band interrogating radars or both. Other variations in the invention will be apparent to those skilled in the art.

I claim:

1. A radar interrogator/transponder for cooperation with a primary pulse radar system comprising:
   (a) a detector responsive to signals received in a first frequency range of said primary pulse radar;
   (b) a transmitter/receiver adapted to operate in a second frequency range;
   (c) an interrogating signal generator circuit connected to the transmitter/receiver;
   (d) a synchronising connection from the primary pulse radar to the interrogating signal generator circuit;
   (e) a time delay circuit having an output connected to the interrogating signal generator circuit and to the transmitter/receiver through the switching means such that the interrogating mode is delayed relative to one primary radar pulse signal so as to occur a short time in advance of the subsequent primary radar pulse signal;
   (f) an identification signal generator circuit for producing an identification signal;
   (g) switching means to selectively connect the identification signal generator to the transmitter/receiver when in a transponding mode and to disconnect the identification signal generator from the transmitter/receiver when in an interrogating mode;
   (h) first circuit means responsive to receiving an interrogating signal from another interrogator/transponder in said second frequency range; and
   (i) second circuit means responsive to receiving an identification signal from another interrogator/transponder in said second frequency range; the outputs from the said first circuit means and the detector being so connected that when an interrogating signal and a primary radar pulse signal are received the identification signal produced by the identification signal generator circuit is transmitted by the transmitter/receiver in said second frequency range.

2. A radar interrogator/transponder according to claim 1 wherein a first frequency omnidirectional aerial is connected to the detector and a second frequency omnidirectional aerial is connected to the transmitter/receiver.

3. A radar interrogator/transponder adapted to be used with a primary pulse radar system comprising:
   first detector means responsive to signals received in a first frequency range of the primary pulse radar;
   a transmitter/receiver adapted to operate in a second frequency range, said transmitter/receiver comprising second frequency range receiver means for receiving second frequency range pulses;
   an interrogating signal generator means operatively connected to the transmitter/receiver for generating interrogating pulses to be transmitted by the transmitter/receiver;
   an identification code generator for generating identification pulses to be transmitted by said transmitter/receiver;
   delay means for activating said interrogating signal generator means a predetermined time interval after transmission of pulses by said primary pulse radar;
   control means for activating said identification code generator operatively connected to said first detector means;
   second detector means connected to said second frequency range receiver means for discriminating between interrogating pulses and identification pulses received by said second frequency range receiver means, said second detector means activating said control means when interrogating pulses are received;
   whereby when interrogating pulses are received by said second frequency range receiver means and detected by said second detector means said control means operates to sensitize said first detector means such that when the next first frequency range pulse is received by said first detector means, said control means operates to activate said identification code generator such that pulses in said second frequency range are generated for transmission by said transmitter/receiver.

* * * * *

UNITED STATES PATENT AND TRADEMARK OFFICE
CERTIFICATE OF CORRECTION

PATENT NO. : 4,364,049
DATED : December 14, 1982
INVENTOR(S) : MOORE, et al

It is certified that error appears in the above-identified patent and that said Letters Patent is hereby corrected as shown below:

Column 2, Line 25 "1" should be "/".

Column 2, Line 27 "1" should be "/".

Column 2, Line 34 "1" should be "/" (2 occurrences).

Column 2, Line 36 "superhot" should be "superhet".

Column 2, Line 38 "1" should be "/".

Column 3, Lines 16, 18 delete commas.

Signed and Sealed this

Twelfth Day of June 1984

[SEAL]

Attest:

Attesting Officer

GERALD J. MOSSINGHOFF

Commissioner of Patents and Trademarks